United States Patent [19]

Fage

[11] 4,212,442
[45] Jul. 15, 1980

[54] THRUST REVERSER

[75] Inventor: Etienne Fage, Jouy en Josas, France

[73] Assignee: Societe ASTECH, Meudon La Foret, France

[21] Appl. No.: 881,045

[22] Filed: Feb. 24, 1978

[30] Foreign Application Priority Data

Mar. 4, 1977 [FR] France ............................ 77 06359

[51] Int. Cl.$^2$ ............................................. B64D 33/04
[52] U.S. Cl. .......................... 244/110 B; 239/265.29;
60/230; 92/138; 92/108
[58] Field of Search ............... 244/110 B; 239/265.37,
239/265.29; 60/229-230; 92/138, 108, 26

[56] References Cited

U.S. PATENT DOCUMENTS

| 1,757,885 | 5/1930 | Weaver .................................. 92/138 |
| 2,851,995 | 9/1958 | Westcott, Jr. ............................ 92/26 |
| 3,164,956 | 1/1965 | Colebrook et al. .............. 239/265.29 |
| 3,338,140 | 8/1967 | Sheesley ................................. 92/138 |
| 3,419,218 | 12/1968 | Compbell et al. .............. 239/265.37 |
| 3,532,275 | 10/1970 | Hom et al. ...................... 239/265.37 |
| 3,931,944 | 1/1976 | Capewell et al. ................ 244/110 B |
| 4,119,017 | 10/1978 | Nusbaumer et al. ................. 92/108 |
| 4,147,027 | 4/1979 | Greathouse ...................... 239/265.37 |

FOREIGN PATENT DOCUMENTS 7409423 7/1974 Netherlands ............................... 92/108

Primary Examiner—Galen L. Barefoot
Attorney, Agent, or Firm—Merriam, Marshall & Bicknell

[57] ABSTRACT

The invention relates to a thrust reverser for a jet engine of an aircraft, which comprises two symmetrical doors pivotally mounted about an axis which is transverse and substantially diametrical to the jet of said engine and which is disposed downstream of the jet exhaust pipe thereof, the doors each being pivoted due to two diametrically opposite hinges and occupying a folded or stowed position in which they form part of the fairing of the engine or fuselage of the aircraft, or an unfolded or opened out position in which they are disposed transversely to the jet, while at least one longitudinal jack is provided at the level of a hinge, for the simultaneous control of the doors via connecting rods. According to the invention, this reverser is characterized, on the one hand, in that the jack comprises two aligned pistons rigidly connected by a common intermediate piston rod, each piston being housed in a corresponding cylinder and the two cylinders being rigidly connected together, and, on the other hand, in that the connecting rods for controlling the doors are pivoted on the intermediate piston rod. The invention finds particular application to the braking of aircraft.

9 Claims, 6 Drawing Figures

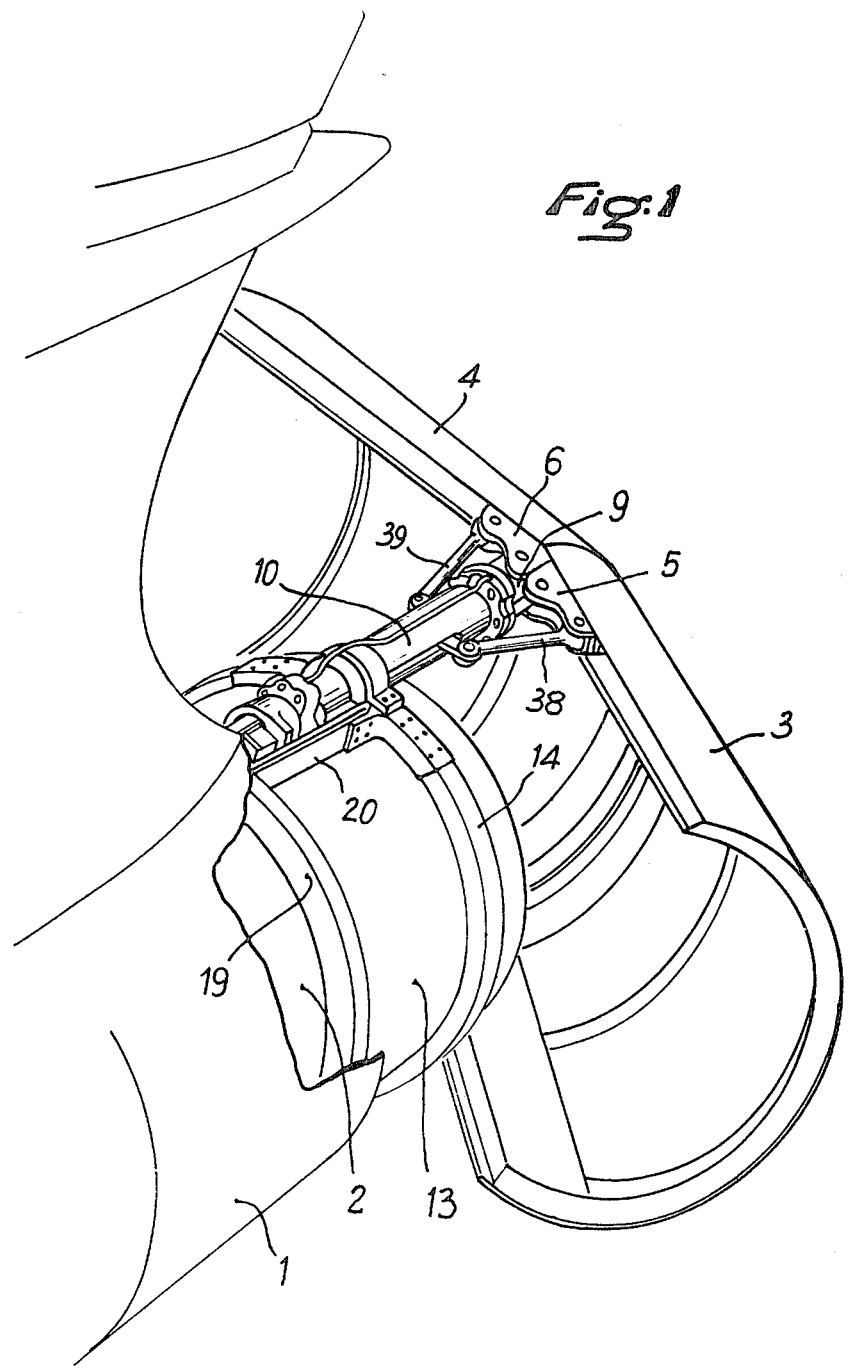

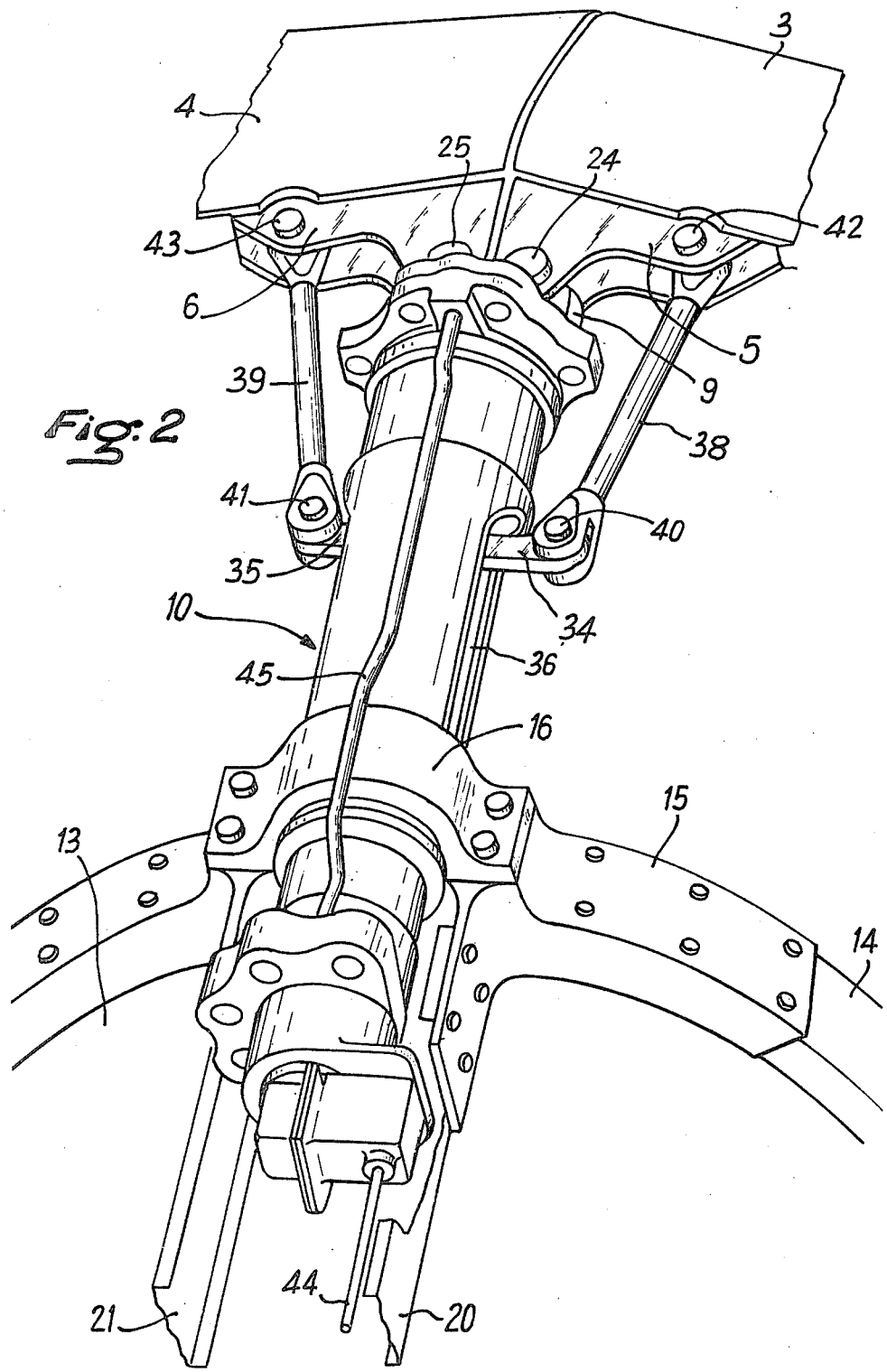

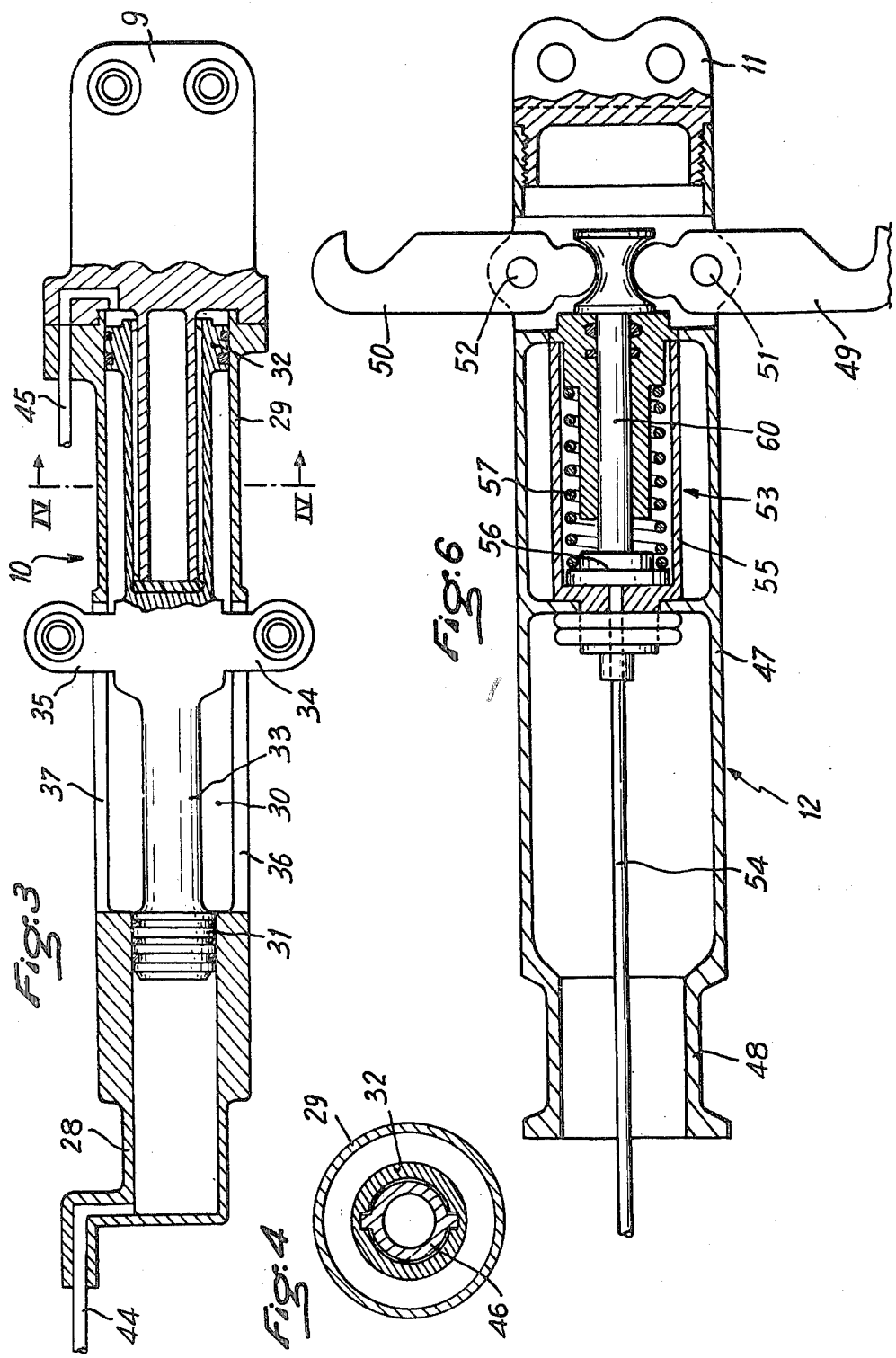

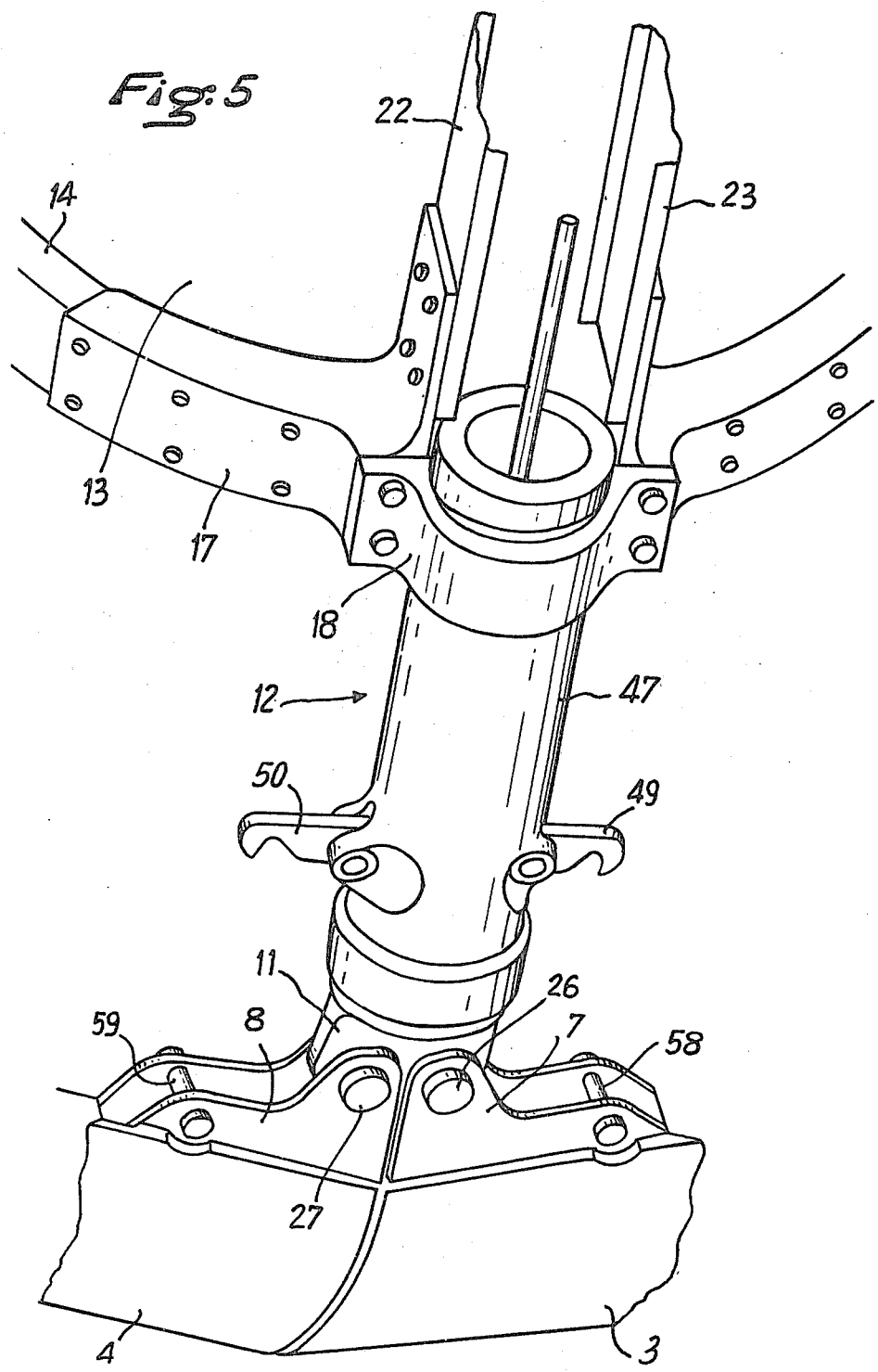

THRUST REVERSER

The present invention relates to a thrust reverser for a jet engine, with or without by-pass of the main jet, mounted in particular on an aricraft.

With a view to shortening the distance run by an aircraft between landing and stopping or to increasing safety when braking on a damp or icy runway, a reverser is known to be used on jet-engined aircraft, which produces a braking thrust.

To this end, a thrust reverser is already known which comprises two symmetrical doors pivotally mounted about an axis which is disposed downstream of the jet exhaust pipe thereof, said doors occupying a folded, or stowed, position in which they form part of the fairing of said engine or fuselage of the aircraft, or an unfolded, or opened out, position, in which they are disposed traversely with respect to said jet.

In this known thrust reverser, the doors are mounted to pivot due to two diametrically opposite hinges and are controlled by two longitudinal jacks acting at the level of said hinges. Each jack is common to the two doors and, to this end, the end of its piston rod directed towards said doors, is connected to each of them by a connecting rod.

It will be noted that, in such a device, the jacks act on the doors by the end of their piston rod. The result is that, in extension, i.e. when the doors are unfolded and undergo high aerodynamic stresses, said piston rods are in considerable overhang, this causing a lack of rigidity and being a source of vibrations.

It is an object of the invention to overcome these drawbacks.

In accordance with the invention, the thrust reverser for a jet engine of an aircraft, which reverser comprises to symmetrical doors pivotally mounted about an axis which is transverse and substantially diametrical to the jet of said engine and which is disposed downstream of the jet exhaust pipe thereof said doors each being pivoted due to two diametrically opposite hinges and occupying a folded or stowed position in which they form part of the fairing of said engine or fuselage of the aircraft, or an unfolded position in which they are disposed transversely with respect to said jet, whilst at least one longitudinal jack is provided at the level of a hinge, for the simultaneous control of said doors via connecting rods, is noteworthy, on the one hand, in that said jack comprises two aligned pistons rigidly connected by a common intermediate piston rod, each piston being housed in a corresponding cylinder and the two cylinders being rigidly connected together, and, on the other hand, in that said connecting rods for controlling the doors are pivoted on said intermediate piston rod.

In this way, a control jack is obtained which, even when the doors are in unfolded or opened out position, is extremely rigid and cannot be the cause of parasitic vibrations.

The two cylinders of the jack are preferably rigidly connected together by a sleeve provided with longitudinal slots, whilst the common intermediate piston rod comprises lugs for the pivoting of the connecting rods passing through said slots. Of course, the body of the two cylinders and the slotted sleeve may be integral with each other. This single piece then carries at one of its ends, the corresponding hinge for the doors.

The jacks are advantageously hydraulic and the admission and evacuation pipes for the hydraulic fluid are arranged on the cylinder side opposite the common intermediate piston rod.

To avoid any rotation of the pistons with respect to the cylinders, it is advantageous if said common intermediate piston rod is at least partly hollow to serve as housing for a longitudinal projection of corresponding shape, said housing and said projection being provided with sets of cooperating longitudinal grooves and ribs.

Experience has shown that the double-body control jack according to the invention was sufficiently rigid for the control of the doors to be effected by one jack only, whilst the known reverser required two diametrically opposite jacks.

Thus, according to the invention, in place of the unnecessary jack of the known reverser, it is possible to dispose a hydraulic device for locking the doors in folded or stowed position.

This hydraulic locking device may comprise a longitudinal cylinder, for example whose dimensions are similar to those of the double-body control jack, inside which is housed a jack controlling outer pivoting hooks, adapted to cooperate with complementary locking members provided on the doors.

The invention will be more readily understood on reading the following description with reference to the accompanying drawings, in which:

FIG. 1 shows a perspective view of the rear part of an aircraft, with central engine, provided with a thrust reverser according to the invention.

FIG. 2 shows a perspective plan view of a double-body control jack according to the invention.

FIG. 3 is a schematic longitudinal section through the jack of FIG. 2.

FIG. 4 is a tranverse section along line IV—IV of FIG. 3, illustrating the anti-rotation mechanism of the double piston.

FIG. 5 shows a perspective plan view from beneath of the hydraulic locking device according to the invention.

FIG. 6 is a schematic longitudinal section of the hydraulic locking device of FIG. 5.

In these Figures, like elements are designated by like references.

Referring now to the drawings, FIG. 1 shows the rear of an aircraft, in perspective, which comprises a central engine 2, provided with a thrust reverser comprising two identical reverser doors 3 and 4, pivoted about a vertical axis disposed downstream of the fan nozzle of the engine 2. To this end, the reverser doors 3 and 4 comprise in their upper part, hinge devices 5 and 6 respectively, and, in their lower part, hinge devices 7 and 8 respectively.

The upper hinge devices 5 and 6 of the doors 3 and 4 are pivoted at the rear end 9 of the body of a hydraulic doublebody control jack 10, whilst the lower hinge devices 7 and 8 of said doors are pivoted at the rear end 11 of a hydraulic locking device 12. The control jack 10 and the locking device are diametrically opposite each other and are fixed on the fan duct 13 of the engine 2. To this end, the rear frame 14 of this fan duct comprises an upper fitting 15, with cap 16, for fixing the control jack 10 and a lower fitting 17, with cap 18 for fixing the locking device 12. Thus, the control jack 10 and the locking device 12 are directly mounted on the rear frame 14. Moreover, the fittings 15 and 17 are also fixed to the frame 19 preceding frame 14, via longitudinal members 20, 21 and 22, 23 respectively.

It will be seen that the rear end 9 of the jack body 10, and 11 of the locking device 12 may thus act respectively as upper and lower pivot support of the doors 3 and 4, with respect to the fan duct 13.

The hinge devices 5 and 6 are pivoted on the rear end 9 via pins 24 and 25 respectively, whilst the hinge devices 7 and 8 are pivoted on the rear end 11 by means of pins 26 and 27 respectively.

FIG. 3 illustrates the structure of the control jack 10. Said latter comprises two distinct aligned cylinders 28 and 29, but separated from each other, and connected by a sleeve 30. The bodies of the cylinders 28, 29 and the sleeve 30 are fast with one another and can only form one piece.

Pistons 31 and 32 are respectively arranged inside cylinders 28 and 29. The pistons 31 and 32 are joined to each other by a common intermediate piston rod 33, comprising diametrically opposite fastening lugs 34 and 35, passing through the side wall of the sleeve 30 through longitudinal slots 36 and 37.

Connecting rods 38 and 39 are pivoted respectively on the fastening lugs 34 and 35, via pins 40 or 41 (cf. FIG. 2).

At their ends opposite the lugs 34 and 35, the connecting rods 38 and 39 are pivoted on the upper hinge devices 5 and 6, respectively, via pins 42 and 43.

The hydraulic fluid admission and evacuation in the cylinders 28 and 29 are effected through pipes 44 and 45, opening in that part thereof opposite the intermediate piston rod 33.

When the pipe 44 is connected to a source of pressurised hydraulic fluid, whilst pipe 45 is connected to evacuation (situation shown in FIG. 3), the piston 31- piston rod 33-piston 32 assembly moves towards the right in FIG. 3 and the connecting rods 38 and 39 force the doors 3 and 4 to unfold and take the position shown in FIG. 1. In opened out position, the doors 3 and 4 may be locked by a mechanical device (not shown).

Inversely, when the pipe 45 is connected to the source of pressurised hydraulic fluid, whilst pipe 44 is connected to evacuation, the piston 31-piston rod 33- piston 32 assembly moves towards the left of FIG. 3 and the rods 38 and 39 return the doors 3 and 4 into a position folded along the fan duct 13.

To avoid the assembly 31, 32, 33 rotating with respect to the assembly 28, 29, 30, the piston rod 32 comprises a coaxial bore into which penetrates a cylindrical projection 46 fast with the assembly 28, 29, 30 and said bore and projection are provided with cooperating longitudinal grooves and ribs (cf. FIG. 4).

FIGS. 5 and 6 illustrate the hydraulic device 12 for locking the doors 3 and 4 in folded or stowed position.

This locking device 12 comprises a cylindrical body 47, whose dimensions are similar to those of assembly 28, 29, 30 and at the free end of which is disposed the hinge end 11 of the doors 2 and 3. At its other end, the cylindrical body 47 comprises a shoulder 48 intended to cooperate with the cap 18 of the fitting 17. On the body 47 are pivoted two diametrically opposite side hooks 49 and 50, pivoting about axes 51 and 52, at right angles to the longitudinal direction of the body 47. Inside said latter is housed a hydraulic jack 53, adapted to be supplied via a pipe 54. The cylinder 55 of the jack 53 is fixed with respect to the body 47, whilst the piston 56 is loaded by a spring 57. When the doors 3 and 4 are folded, the hooks 49 and 50, under the action of the spring 57, are in engagement with pins 58 and 59, fast with the hinge devices 7 and 8 respectively and thus locking said doors in folded position.

The piston 56 is fast with a piston rod 60, in engagement with the catches of hooks 49 and 50. When a hydraulic fluid is admitted in the pipe 54, the piston 56 is pushed against the action of the spring 57 (towards the right in FIG. 6) and the hooks 49 and 50 tip, thus releasing the pins 58 and 59. The doors 3 and 4 may then be unfolded by action of the control jack 10. When the doors 3 and 4 return to folded position, the pins 58 and 59 automatically engage behind the hooks 49 and 50.

Due to the invention, a thrust reverser in thus obtained, provided with a particularly simple, reliable and rigid device for controlling the doors. Moreover, it is less expensive than known inversers, as it requires only one control jack.

What we claim is:

1. A thrust reverser for a jet engine of an aircraft, comprising:

two symmetrical doors pivotally mounted about an axis which is transverse and substantially diametrical to the jet of said engine, and which is disposed downstream of the jet exhaust pipe thereof, each of said doors being pivoted for movement between a folded or stowed position in which said doors are clear of said jet, and an unfolded or opened out position in which said doors are disposed transversely and in the path of said jet;

at least one longitudinal power driven control jack for the simultaneous control of said doors, said jack comprising two aligned pistons, rigidly connected by a common intermediate piston rod, each piston being housed in a corresponding cylinder, first connecting means interconnecting said cylinders to form a rigid self-supporting cylinder assembly having an upstream cylinder and a downstream cylinder;

second connecting means independent of said first connecting means, said second means connecting said upstream cylinder to said jet engine;

at least two connecting rods each having one end pivotally connected to said piston rod and the other end pivotally connected to a door, and a hinge for each door mounted directly on said downstream cylinder.

2. A thrust reverser as claimed in claim 1 wherein said first connecting means is a sleeve provided with longitudinal slots, and said intermediate piston rod is provided with lugs passing through said slots, to which lugs are connected the ends of said connecting rods.

3. A thrust reverser as claimed in claim 2, wherein said two cylinders and said slotted sleeve are integrally formed.

4. A thrust reverser as claimed in claim 1, wherein said jack is hydraulically driven and is provided with hydraulic fluid admission and evacuation pipes arranged on the cylinder ends opposite the common intermediate piston rod.

5. A thrust reverser as claimed in claim 1, comprising a single control jack and, diametrically opposite this jack with respect to said engine, a hydraulically driven device for locking said doors in folded position, a hinge for each door being mounted on the downstream end of said hydraulic device.

6. A thrust reverser as claimed in claim 5, wherein the hydraulic locking device comprises a longitudinal cylinder having dimensions similar to those of said control jack, inside which cylinder is housed a jack controlling outer pivoting hooks, adapted to cooperate with complementary locking members provided on the doors.

7. A thrust reverser as claimed in claim 5, wherein said hydraulic locking device operates with elastic locking and hydraulic unlocking.

8. A thrust reverser as claimed in claim 5, wherein said control jack and said hydraulic locking device are adapted to be fixed on the last frame of a fan duct of said engine.

9. A thrust reverser as claimed in claim 8, wherein said control jack and said hydraulic locking device are mounted on a fitting adapted to be fixed to the last and next-to-last frames of a fan duct of said engine.

* * * * *

UNITED STATES PATENT AND TRADEMARK OFFICE
CERTIFICATE OF CORRECTION

PATENT NO. : 4,212,442
DATED : July 15, 1980
INVENTOR(S) : ETIENNE FAGE

It is certified that error appears in the above–identified patent and that said Letters Patent are hereby corrected as shown below:

Col. 1, line 19, "traversely" should be --transversely--.

Col. 1, line 37, "to" should be --two--.

Col. 2, line 37, "tranverse", should be --transverse--.

Signed and Sealed this

Third Day of February 1981

[SEAL]

Attest:

RENE D. TEGTMEYER

Attesting Officer  Acting Commissioner of Patents and Trademarks